No. 687,161. Patented Nov. 19, 1901.
J. LEWIS.
LOCKING SINGLETREE HOOK.
(Application filed July 1, 1901.)
(No Model.)
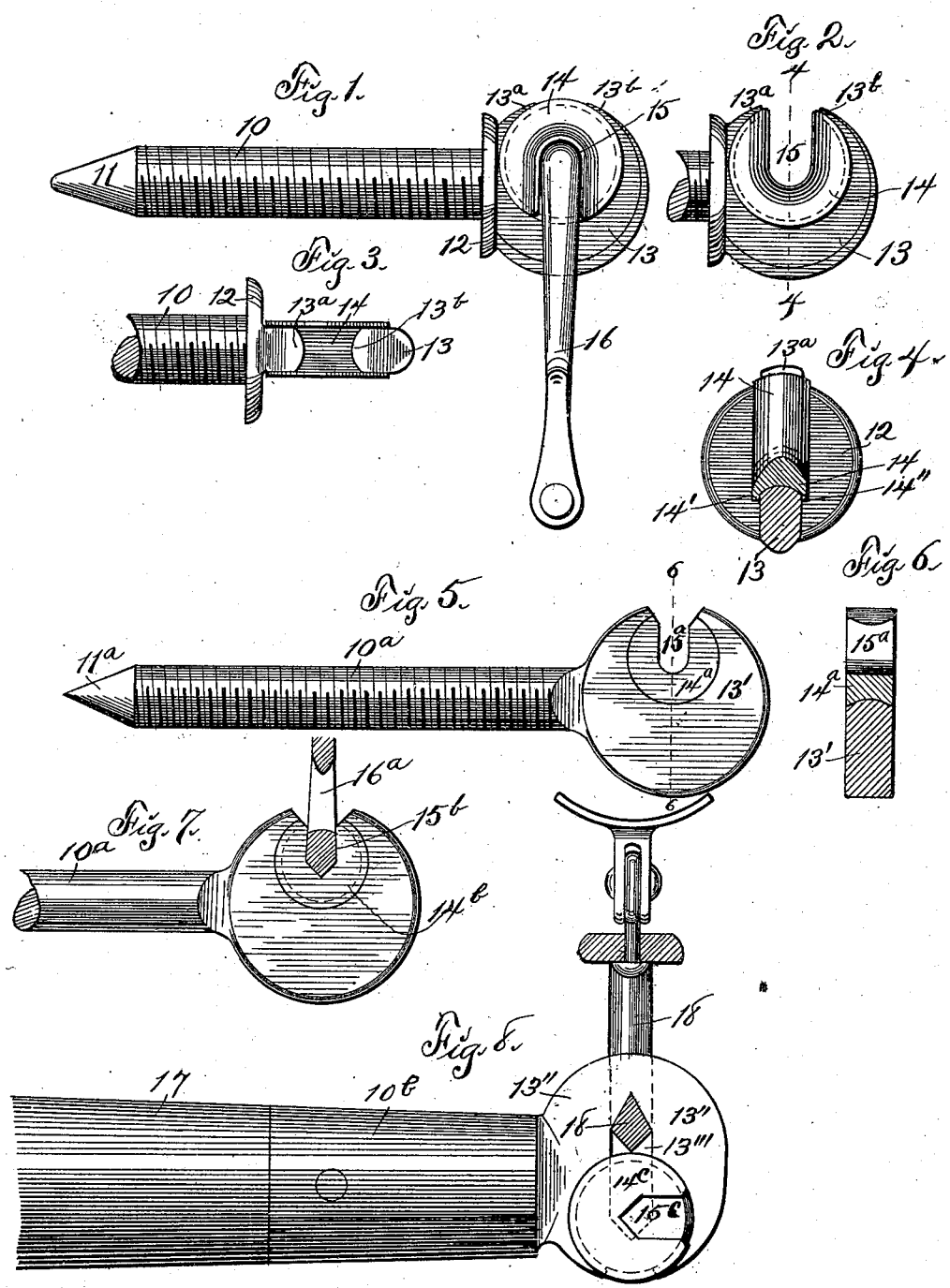
Attest:
W. E. Ellis
M. W. Winter
Inventor:
Jesse Lewis,
By H. Sweet, Att'y

UNITED STATES PATENT OFFICE.

JESSE LEWIS, OF SIBLEY, IOWA, ASSIGNOR OF THREE-FOURTHS TO WALTER BANCROFT STEVENS, OF SIBLEY, IOWA, AND CHARLES S. McLAURY, OF SHELDON, IOWA.

LOCKING SINGLETREE-HOOK.

SPECIFICATION forming part of Letters Patent No. 687,161, dated November 19, 1901.

Application filed July 1, 1901. Serial No. 66,712. (No model.)

*To all whom it may concern:*

Be it known that I, JESSE LEWIS, a citizen of the United States of America, and a resident of Sibley, Osceola county, Iowa, have invented a new and useful Locking Singletree-Hook, of which the following is a specification.

The object of this invention is to provide improved means for attaching a trace, toggle, or cockeye to an end of a singletree or for attaching a neck-yoke to the forward end of the tongue of a vehicle, whereby accidental displacing or detaching of the devices thus connected shall be avoided.

My invention consists of the construction, arrangement, and combination of elements hereinafter set forth, pointed out in my claims, and illustrated by the accompanying drawings, in which—

Figure 1 is a plan view illustrating one of my improved devices with the cockeye attached thereto in position for practical use. Fig. 2 is a plan view of a portion of one of my devices, showing the locking tumbler or block open, as required to permit the insertion or removal of a cockeye, toggle, or trace. Fig. 3 is a rear edge view of a portion of the device shown in Fig. 1, illustrating the relations of the hook and locking-block. Fig. 4 is a cross-section of the device on the indicated line 4 4 of Fig. 2. The devices shown in Figs. 1, 2, 3, and 4 preferably are made by molding or casting. Fig. 5 is a plan of a modified form of my device. Fig. 6 is a cross-section on the indicated line 6 6 of Fig. 5. Figs. 5 and 6 illustrate a device preferably made by forging. Fig. 7 illustrates a further modified form of my device and a slightly-modified form of cockeye or toggle end and may be made either by molding or forging. Fig. 8 is a side elevation illustrating the application of my device to the forward end of a wagon-tongue as adapted for attaching to said tongue of a neck-yoke.

In the construction of the device as illustrated in Figs. 1, 2, 3, and 4 the numeral 10 designates a stem of cylindrical form and provided with a pointed extremity 11. The stem may be either cast or forged and preferably is screw-threaded on its exterior the better to adapt it for seating in the end of a singletree or other wooden bar. It is to be understood that the device may be made with sockets in lieu of the stems, so shaped and arranged as to receive the end of a singletree or other wooden bar. A flange 12 is formed on and peripherally of one end of the stem 10, and a hook or head 13 is formed on and extends outwardly from said flange and stem, the opening of the hook being at one side. The hook is formed with a circular aperture set eccentrically relative to the periphery of the hook portion and with a rounded inner face in respect of cross-section. A locking-block 14 of generally circular form and grooved in its periphery is mounted in the aperture of the hook 13 loosely and free for revolution therein. The grooved periphery of the locking-block 14 receives and slidingly contacts with the rounded inner surface of the hook or wall of the aperture thereof. The stem, flange, hook, and locking-block may be molded and cast at one operation in the position shown, the points $13^a$ $13^b$ of the hook retaining the locking-block against removal through the opening of the hook and flanges $14^a$ $14^b$ on the locking-block engaging opposite faces of the hook 13 and retaining said locking-block in its proper relation and position. The locking-block is radially slotted at 15 to a point beyond its center, and the width of the slot therein does not exceed the width of the opening between the points $13^a$ $13^b$ of the hook, the depth of the slot being such as to accommodate a cockeye, trace end, or toggle end. In practical use the device is mounted on a singletree or in another place where it is desired for use, and the locking-block is turned into the position shown in Figs. 2 and 4. A cockeye 16, toggle, or trace end then is introduced between the points $13^a$ $13^b$ of the hook 13 and turned into a proper draft position, as illustrated in Fig. 1, turning with it the locking-block. The application of draft to the cockeye 16, toggle, or trace end will strain upon the thicker portion of the hook 13. In order to effect a removal or dislodgment of the cockeye 16, toggle, or trace end from the hook, it is necessary to turn said cockeye to the rear, turning with it the locking-block 14 in order that the slot 15 of the locking-block will register with the opening between the points 13ª 13ᵇ of the hook, and said rearward turning of the cockeye cannot arise through accidental means, such as the slackening or vibrating of the trace in use, but depends for its operation wholly upon manual adjustment.

In the device as illustrated in Figs. 5 and 6 the stem 10ª, point 11ª, and hook 13′ preferably are formed by forging of wrought metal, and an aperture is formed in the hook and eccentrically thereof with a swelled or rounded wall. A locking-block 14ª preferably is formed by forging of wrought metal and shaped with a radial notch 15ª and a grooved periphery. The locking-block 14ª is mounted in the aperture of the hook by movement through the opening between the points of the hook, and then said points of the hook are approximated mechanically by the blows of a hammer or squeezing in the jaws of a vise, clamp, or die to the extent of bringing the hook into sliding engagement with the locking-block and inclosing the locking-block against accidental removal.

In Fig. 7 I illustrate the locking-block 14ᵇ formed with a radial notch 15ᵇ with a flaring mouth, the inner extremity of the notch being V-shaped. In connection with this construction of locking-block I employ a cockeye or toggle end 16ª, having its terminal bar V-shaped on its outer edge. There is an advantage in constructing the locking-block and cockeye as illustrated in Fig. 7 in that the operation of inserting the cockeye into the block is facilitated by the engagement of the angular apex thereof in the flaring mouth of the block, to the end that said block may be adjusted when otherwise out of position into the proper position to receive the cockeye.

As illustrated in Fig. 8, the numeral 17 designates a vehicle-tongue to which a safety-hook 13″ is attached by a socket 10ᵇ, the opening of the hook being downward. A neck-yoke ring 18 is formed with a bar V-shaped on its outer edge to enter and fit the V-shaped notch 15ᶜ of the locking-block 14ᶜ. In the use of this device it is necessary to turn the ring downwardly and insert the bar thereof into the locking-block and turn the ring upwardly, together with the locking-block, to bring the neck-yoke into a position upon the tongue and into proper relation for attachment to a harness.

In the use of my device there are fewer points of contact and wear than heretofore has been customary, thus insuring the stability of the parts as designed.

In Fig. 8 I also illustrate the inner edge of the bar V-shaped and arranged for engagement with a V-shaped notch 13‴ in the hook 13″ when the parts are placed in the proper positions for draft and use, thus confining the wear of the hook to said notch 13‴. This element of construction further insures the retention of the locking-block and ring in proper relations to the hook to prevent accidental displacement or removal of the ring or hook.

I claim as my invention—

1. In a locking singletree-hook, the stem, a pointed end on said stem, a flange on said stem opposite the pointed end, the flattened hook member on said stem outside the flange, which flattened hook member is formed with a circular aperture disposed eccentrically therein and opening laterally therefrom, a locking-block notched radially and formed with a grooved periphery and mounted in the aperture of the hook member, the grooved periphery of the locking-block fitting snugly the wall of the aperture of the hook member and the notch thereof being arranged to register at times with the opening of the hook member.

2. In a device of the class described, a locking-block having a grooved periphery and formed with a radial notch having a flaring mouth, the inner wall of the radial notch being V-shaped, in combination with a cockeye having a V-shaped outer edge.

3. In a device of the class described a locking-block formed with a radial notch having a flaring mouth, the inner wall of the radial notch being V-shaped, in combination with a hook in which said block is mounted for rotation, the hook being formed with a V-shaped notch diametrically opposite the opening thereof and arranged for opposition to the V-shaped end of the notch in the block at times.

4. In a singletree-hook, a pointed stem, a head thereon having a rounded central opening and a slot, and a turning-block formed of one piece of metal and notched radially for rotation in said rounded central opening.

Signed by me at Des Moines, Iowa, this 27th day of May, 1901.

JESSE LEWIS.

Witnesses:
S. C. SWEET,
N. W. WINTISS.